(12) United States Patent
Tamaoki et al.

(10) Patent No.: US 6,332,703 B1
(45) Date of Patent: Dec. 25, 2001

(54) LIGHTING DEVICE

(75) Inventors: Keiko Tamaoki, Sendai; Kiyotaka Minato, Utsunomiya; Satoshi Tamaoki, Sendai, all of (JP)

(73) Assignee: LAB. Sphere Corporation, Miyagi-ken (JP)

( * ) Notice: Subject to any disclaimer, the term of this patent is extended or adjusted under 35 U.S.C. 154(b) by 0 days.

(21) Appl. No.: 09/530,127

(22) PCT Filed: Aug. 27, 1999

(86) PCT No.: PCT/JP99/04646

§ 371 Date: Apr. 27, 2000

§ 102(e) Date: Apr. 27, 2000

(87) PCT Pub. No.: WO00/12928

PCT Pub. Date: Mar. 9, 2000

(30) Foreign Application Priority Data

Sep. 1, 1998 (JP) ................................. 10-247398

(51) Int. Cl.[7] ................................ F21V 7/04
(52) U.S. Cl. ................. 362/551; 362/278; 362/285; 362/556
(58) Field of Search .................. 362/551, 556, 362/572, 574, 278, 285

(56) References Cited

U.S. PATENT DOCUMENTS 4,414,608 * 11/1983 Furihata ................................. 362/32
4,597,030 * 6/1986 Brody et al. ........................... 362/32
4,870,543 * 9/1989 Born et al. ............................. 362/61

OTHER PUBLICATIONS

JP Patent Laid–open pub. No. Heisei 5–311733 (311733/1993) published on Nov. 22, 1990 with English abstract.
JP Patent Laid–open pub. No. Heisei 9–237501 (237501/1997) published on Sep. 9, 1997 with English abstract.
JP Patent Laid–open pub. No. Heisei 10–106331 (106331/1998) published on Apr. 24, 1998 with English abstract.

* cited by examiner

*Primary Examiner*—Sandra O'Shea
*Assistant Examiner*—John Anthony Ward
(74) *Attorney, Agent, or Firm*—Armstrong, Westerman, Hattori, McLeland & Naughton, LLP

(57) ABSTRACT

A lighting device 10, having a light irradiation portion 11 comprised of light-emitting elements; a freely turnable flexible shaft 12; extendible portions 13 that support the said flexible shaft at the base, house the flexible shaft, and provide a nested housing for each one of the extendible portions within one another; a drive portion 14 that drives the light irradiation portion; a power supply portion 15 that supplies electric power to the drive portion; and a case 16 covering the drive portion at least, which more preferably covers the extendible portions, as well. Moreover, this includes ones having a spring mechanism that allows said extendible portions and said flexible shaft to freely extend, and by the spring mechanism, as the flexible shaft extends, said nested extendible portions can be extended in succession.

11 Claims, 5 Drawing Sheets

LIGHTING DEVICE

TECHNICAL FIELD

The present invention relates to a lighting device that is made capable of irradiating light arbitrarily to a desired place.

BACKGROUND TECHNOLOGIES

Conventionally, so-called indoor light, such as fluorescence light, incandescent light, etc., which is installed on a ceiling surface has been used as a lighting device, for example in sickrooms in hospitals, etc. Due to the location of the lighting device, the lighting effects at the bedside of a patient lain in a sickroom in hospital become comparatively weak. Therefore, even when the indoor light is turned on, in order to examine the conditions of a patient in an accurate and detailed manner, it is required to use a flashlight such as a penlight, etc. to pinpoint parts of interest, in addition to the indoor light.

However, for examining the conditions of a patient with such a flashlight, it is necessary that the examiner has a flashlight, which is capable of irradiating light to parts of interest, readily available at hand; for this reason, one hand is occupied by holding such a flashlight, which has been considered problematic in terms of mechanical operations thereof.

Moreover, when a flashlight is used as a lighting device to examine, manipulate, or operate narrow and complex locations, the light from a hand-held flashlight is irradiated in a straight direction, which results in leaving some portions insufficiently irradiated, wherein portions to be observed cannot be fully illuminated as desired.

In connection with the above, an object of the present invention is to provide a lighting device that can irradiate light arbitrarily to a desired place.

SUMMARY OF THE INVENTION

From one aspect of the present invention, which achieves the above object:

There is provided a lighting device having: a light irradiation portion comprised of a light-emitting element; a flexible shaft that is turnable or extensible to support the said light irradiation portion at the tip; extendible portions or that support the said flexible shaft at the base, house the flexible shaft, and provide nested housing for each of the extendible portions within one another; a drive portion that drives the light irradiation portion; a power supply portion that supplies electric power to the drive portion; and a case covering the drive portion at least, which more preferably covers the extendible portions, as well.

A lighting device according to the present invention may have a rotatable mechanism portion that rotates the above-mentioned light irradiation portion, between the light irradiation portion and the flexible shaft.

As the above-mentioned light irradiation portion, light-emitting elements can be used advantageously.

The above-mentioned extendible portions are preferably extended from the above-mentioned case, and can be housed in the said case when it is in the shortened state. Moreover, these extendible portions may be arranged so that they can be constructed to maintain a desired angle to the case.

Moreover, the above-mentioned case according to the present invention provides fixing portions to a wall surface, a ceiling surface, etc., and preferably has an electric power supply cable winding mechanism.

From another aspect of the present invention:

The above-mentioned case may be constructed to house the above-mentioned extendible portions, the drive portion, and the power supply portion comprised of dry cells, all of which portability can be attained.

Moreover, a lighting device according to the present invention is preferably comprised of the above-mentioned case serving as a case for various devices simultaneously, wherein the light irradiation portion lights up desired locations such as operation panels of various devices.

According to the above-mentioned construction, by extending the extendible portions as well as turning the flexible shaft, the light irradiation portion comprised of a light-emitting element at the tip can pinpoint a desired direction. Therefore, the light emitted from the light irradiation portion will be cast to the desired direction; thus, the desired location can be illuminated.

Furthermore, by housing the flexible shaft inside the extendible portions as well as shortening the extendible portions, both the flexible shaft and the extendible portions can be housed in the case compactly. Thus, physical space required for installation will be reduced. These extendible portions may be constructed to have a plurality of nested parts.

When the above-mentioned case is attached to a surface i.e., wall, ceiling, etc., and the light irradiation portion is made to light up desired locations, it is not necessary to handhold the case, the flexible shaft, or the light irradiation portion. Therefore, users can conduct desired operations with the use of both hands.

When the above-mentioned case is formed in shapes such as an oval, rectangle, or other arbitrary shapes that ensure portability, and is made to house the extendible portions, the drive portion, and the power supply portion comprised of dry cells, the lighting device as a whole can be carried around freely as a so-called penlight-type flashlight; and by housing the extendible portions and the flexible shaft in the case, carrying it around as a traditional penlight-type flashlight, and expanding the extendible portions and pulling out the flexible shaft while turning it if necessary, can be used to light up desired locations appropriately, even if they are in such locations as inner parts of various devices, etc.

When the above-mentioned case is constructed to serve as a case for various devices simultaneously, and the light irradiation portion is made to light up desired locations such as an operation panel of various devices, etc., the extendible portions and the flexible shaft can be housed in the case when not in use, otherwise, it can be effectively used to light up desired locations such as operation panels of various devices, etc. by expanding the extendible portions and pulling out the flexible shaft while turning it, if necessary.

From yet another aspect of the present invention, in addition to the construction described in the above-mentioned aspects;

The lighting device has a spring mechanism that provides the above-mentioned extendible portions and the flexible shaft with extensibility, and this spring mechanism provides a construction, where, as the flexible shaft extends, the nested extendible portions extend as well.

This spring mechanism may have lock mechanism, whereby when the apparatus is not in use, it can house the above-mentioned extendible portions and the flexible shaft in the case, and maintain them in their shortened state.

BRIEF DESCRIPTION OF THE DRAWINGS

The present invention will be understood more fully from the detailed description given below and from the accompanying drawings of the preferred embodiment of the invention, which, however, should not be taken to be limitative to the invention, but are for explanation and understanding only.

In the drawings.

BEST MODES FOR CARRYING OUT THE INVENTION

Preferred embodiments of the present invention are described in the following, with occasional references being made to the attached drawings. The embodiments explained in the following do not cover the techniques of the present invention comprehensively, but exemplify embodiments to implement the present invention; thus, it is apparent for any person skilled in the art that a wide variety of variations and conversions, and amendments or deletions of the configuration are conceivable.

Figure 1:
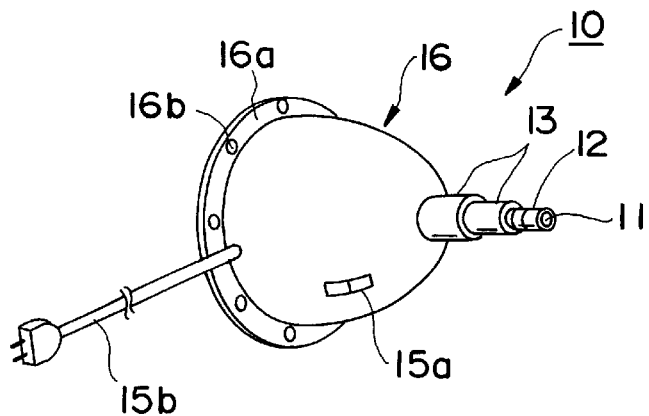
FIG. 1 is a perspective view of one embodiment of a lighting device according to the present invention in its shortened state.
Figure 2:
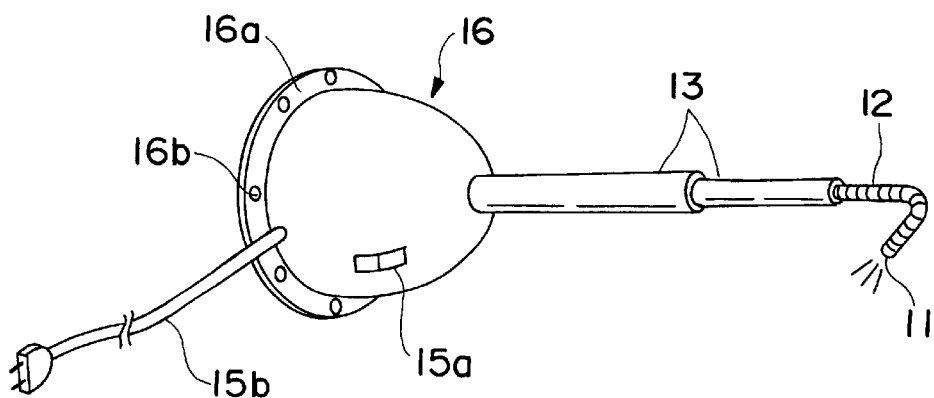
FIG. 2 is a perspective view showing the lighting device shown in FIG. 1 in its extended state.
Figure 3:
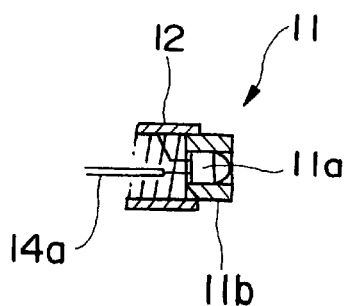
FIG. 3 is a partially-enlarged cross-sectional view centering on the light irradiation portion of the lighting device shown in FIG. 1.

FIGS. 1 to 3 show the embodiment of a lighting device according to the present invention.

Figure 4:
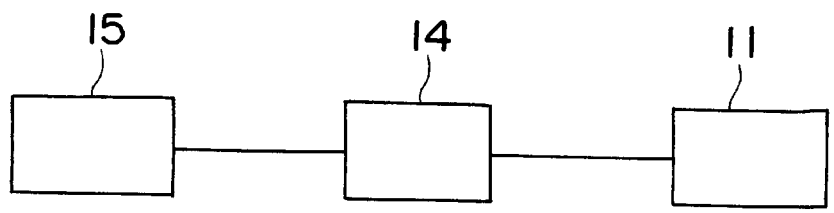
FIG. 4 is a block diagram showing the electric configuration of the lighting device shown in FIG. 1.

In FIGS. 1 and 2, an installation-type lighting device 10 comprises of a light irradiation portion 11, flexible shaft 12 that supports the light irradiation portion 11 at the tip, extendible portions 13 that support the flexible shaft 12 at the base, and a case 16 that supports the extendible portions 13. The case 16 as shown in FIG. 4, has a built-in drive portion 14 that drives the light irradiation portion, and a built-in power supply portion 15 that supplies electric power to the drive portion.

The above-mentioned light irradiation portion 11 is comprised of, as shown in FIG. 3, light-emitting diodes (LED's) 11a, and fixing members 11b that support the light-emitting diodes 11a, and the fixing members 11b are attached to the tip of the flexible shaft 12 of which, will later be described in more detail.

The flexible shaft 12 is able to take on well-known configurations such as the bellows type, wherein the shaft is allowed to freely turn in any arbitrary direction at any location therein and can be maintained in the turned state, and in the shown example, it is comprised of conductive materials. This flexible shaft 12 may be comprised of insulating materials such as acrylic and plastic resins, or alternatively conductive materials covered with insulating materials. Moreover, these alternatives are also applicable to the extendible portions 13 and the case 16, as well.

Incidentally, the bellows-type flexible shaft 12 may be replaced with one having well-known extensible linkages (drawings are omitted herein). When such a linkage is used to comprise the flexible shaft 12, it can be also extended in any desired manner, and freely turned to any arbitrary direction at any location therein.

The above-mentioned extendible portions 13 have well-known constructions as in rod antennae, tripods, etc. that are comprised of a plurality of nested portions being linked to each other in order to provide sliding capabilities, and by individual portions 'sliding in and out, they are constructed to both extend and shorten as a whole, whereas the shown example is comprised of conductive materials.

Moreover, the extendible portions 13 support the flexible shaft 12, ensuring sliding capabilities thereof in such a manner that it can support the base portion 12a when the flexible shaft 12 is pulled out from the extendible portions 13, and that it can house the entire flexible shaft 12 when the flexible shaft 12 is pushed back in to the extendible portions 13.

Incidentally, the extendible portions 13 may take a construction where it is partially integrated into the case 16.

The drive portion 14 is housed inside the case 16, and upon receiving an electric power supply from the power supply portion 15, it supplies driving current to the LED's 11a of the light irradiation portion 11.

Furthermore, a driving current to the LED's 11a is supplied via a connecting cable 14a arranged in the extendible portions 13 and the flexible shaft 12. In FIG. 3, a single connecting cable 14a is provided with its opposite end being embedded in the extendible portions 13 and the flexible shaft 12. The connecting cable 14a needs to be formed so as not to cause breaking of wire after repeated operations of expansion.

The power supply portion 15 is housed in the case 16, and in the shown example, is constructed to be turned on and off by a power switch 15a that is located on the outer surface of the case 16, as well as to obtain appropriate direct-current voltage from alternating-current voltage of 100V supplied via the power supply cable 15b that is connected to an electrical outlet.

The case 16, in the shown example, is formed in a dome or bowl-like shape, and houses the extendible portions 13, the drive portion 14 and the power supply portion 15. The shape of the case 16 is not limited to that of the shown example, but may be formed into any shape, including globular, elliptical, rectangular, parallelepiped shapes and other rectangular shapes, as well.

Moreover, in this embodiment, the case 16 has a fixing portion 16a, and by tightening fixing screws (drawings are omitted herein) into the fixing holes 16b of the fixing portion 16a, the case 16 can be fixed to any desired wall such as a wall surface in a sickroom.

The lighting device 10 according to the present invention is constructed as described above, and as FIG. 1 shows, when the lighting device is not in use, the flexible shaft 12 is stored inside the extendible portions 13, and are stored inside the case 16 completely with the extendible portions 13 shortened. Thus, portions that do extend from the case 16 will be relatively small, which provides easier installation without size being an obstacle.

Incidentally, when in storage, the extendible portions 13 may be locked with a lock mechanism. By doing so, inadvertent damages, etc. due to mischievous behavior by children, etc. can be prevented. Moreover, the extendible portions 13 may be automatically extended as well as providing a release switch for the lock mechanism. The lock mechanism is described later with reference to FIGS. 10 and 11.

When using the lighting device from this position, it is necessary to pull out the extendible portions 13 manually (or electrically) and pull out the flexible shaft 12 from the extendible portions 13 first. Then, by turning the flexible shaft 12 appropriately, the light irradiation portion 11 is faced in a desired direction, as shown in FIG. 1. Thus, the desired location can be clearly illuminated.

Figure 5:
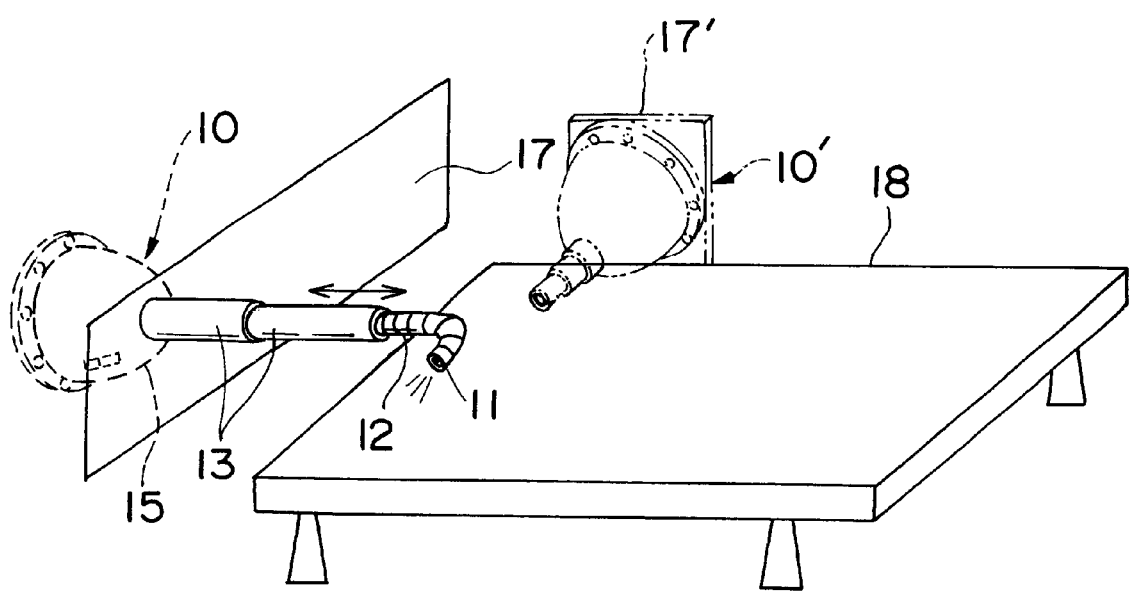
FIG. 5 is a perspective view of the lighting device shown in FIG. 1 when it is used as an auxiliary light at bedside.

As shown in FIG. 5, for example, if a lighting device 10 is installed to a wall surface 17 of a sickroom in that its case 16 is attached to a surface behind the said wall surface 17 or on the said wall surface, then by extending the extendible portions 13 of the lighting device 10, pulling the flexible shaft 12 therefrom, and adjusting the flexible shaft 12 appropriately while maintaining the extended state thereof, light from the light irradiation portion 11 can illuminate desired location on a patient in bed 18. Therefore, even during the nighttime, etc., patients' conditions can be observed in an accurate and detailed manner without disturbing other patients' sleep. Moreover, as the lighting device labeled 10' shows in FIG. 5, can be fixed to a bed by preparing a fixing portion 17' on a part of the bed, or by embedding the case 16 beforehand to the bed, etc., in order to attain integrated embodiment, all of which provide convenience.

Moreover, when a lighting device 10 is incorporated on a bed, dashboard of an automobile or other various device, it may be constructed in such a way the case 16 is housed and incorporated into part of the bed, dashboard or device itself and the extendible portions 13 and/or the flexible shaft 12 can then be extended.

Figure 6:
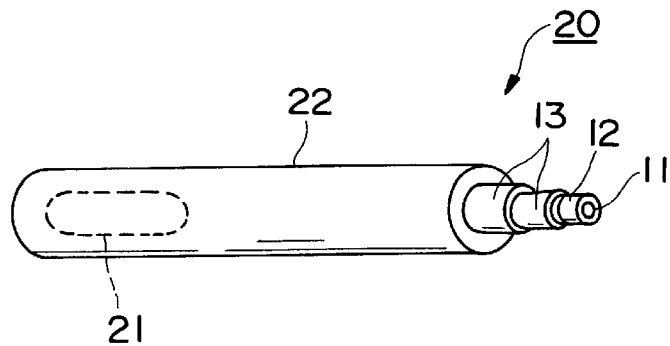
FIG. 6 is a perspective view of the embodiment of another lighting device according to the present invention in its shortened state.

FIG. 6 shows the embodiment of another lighting device according to the present invention.

The lighting device 20 in FIG. 6 is a portable and so-called penlight-type lighting device, and is comprised of a light irradiation portion 11, a flexible shaft 12 that supports the light irradiation portion 11 at the tip, extendible portions 13 that support the flexible shaft 12 at the opposite end, and, as shown in FIG. 4, a drive portion 14 that drives the light irradiation portion, and a power supply portion 21 that supplies electric power to the drive portion 14, and a case 22.

The light irradiation portion 11, the flexible shaft 12, the extendible portions 13, and the drive portion 14 are constructed in the same way as in the lighting device 20 shown in FIGS. 1 and 2, so detailed explanation is omitted herein; however, the lighting device 20 can be used in the rain or underwater unrestrictedly by simple waterproofing.

Figure 7:
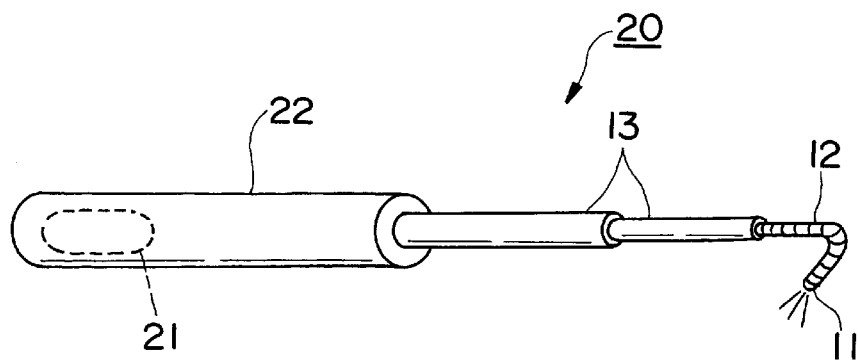
FIG. 7 is a perspective view of the showing the lighting device shown in FIG. 6 in its extended state.

The above-mentioned power supply portion 21 employs, as shown by the dotted lines in FIGS. 6 and 7, cells such as dry or rechargeable batteries.

The above-mentioned case 22 is formed in, for example, a rod-like cylindrical shape, and is compactly constructed to house the flexible shaft 12, the extendible portions 13 and the drive portion 14 so as to provide convenience in terms of portability.

According to the lighting device 20 having the aforementioned construction, even when in the storage state (i.e., shortened state) as shown in FIG. 6, by turning on the light irradiation portion 11, it can be used in the same manner as in a conventional penlight-type flashlight. Moreover, as shown in FIG. 7, by expanding the extendible portions 13, pulling out the flexible shaft 12, and adjusting it appropriately, the light irradiation portion 11 is able to face any desired direction. Therefore, by carrying around this lighting device appropriately, even when internal parts of various devices are complicated locations such as those that are curved, can light up these desired locations appropriately.

Figure 8:
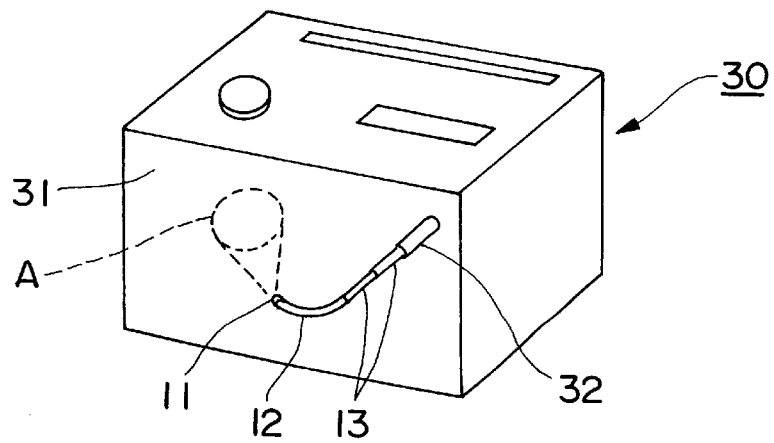
FIG. 8 is a perspective view of the embodiment of yet another lighting device according to the present invention.

FIG. 8 shows the embodiment of yet another lighting device according to the present invention.

In FIG. 8, the device 30 can be various devices such as a measuring apparatus, wherein the operation panel 31 in front is comprised of a plurality of display devices, switches, etc. (drawings are omitted herein) and the operation panel 31 is constructed in incorporating the lighting device 32 therein.

The lighting device 32 is, as in the lighting device 10 shown in FIGS. 1 and 2, comprised of a light irradiation portion 11, a flexible shaft 12, and extendible portions 13, as well as a drive portion and a power supply portion (drawings are omitted herein) that are provided as built-in components of the device 30 to serve as a case.

In a thus constructed lighting device 32, by expanding the extendible portions 13, pulling out the flexible shaft 12, and turning this flexible shaft 12 appropriately, the light irradiation portion 11 can be made to face desired locations (shown in the drawing as region A) of the operation panel. Therefore, even when the device 30 is used in a dark environment, for example, the lighting device 32 lights up the region A that is the desired location of the operation panel 31, wherein not only the location of interest, to which a measurement is to be done, but also switches, display apparatuses, etc. can be appropriately perceived, whereby accurate operation and readings of displays can be achieved.

In the embodiments described in the above, LED's 11a have been employed as light-emitting elements for the light irradiation portion 11; however, without being restricted to these, other kinds of light-emitting elements, incandescent bulbs, etc. may be used as well, and the number or amount thereof may be either singular or plural. Moreover, it is evident that light-emitting elements and incandescent bulbs may be used in combination.

Furthermore, although in the third embodiment as described above and as shown in FIG. 8, descriptions assume that the device 30 is a measuring apparatus as an example, it is not limited to this kind, but any kind of device, including general-purpose devices such as audio equipment and video equipment, various experiment-use devices, laboratory-use devices, etc. can be categorized under the scope of applications of lighting devicees according to the present invention.

Figure 9:
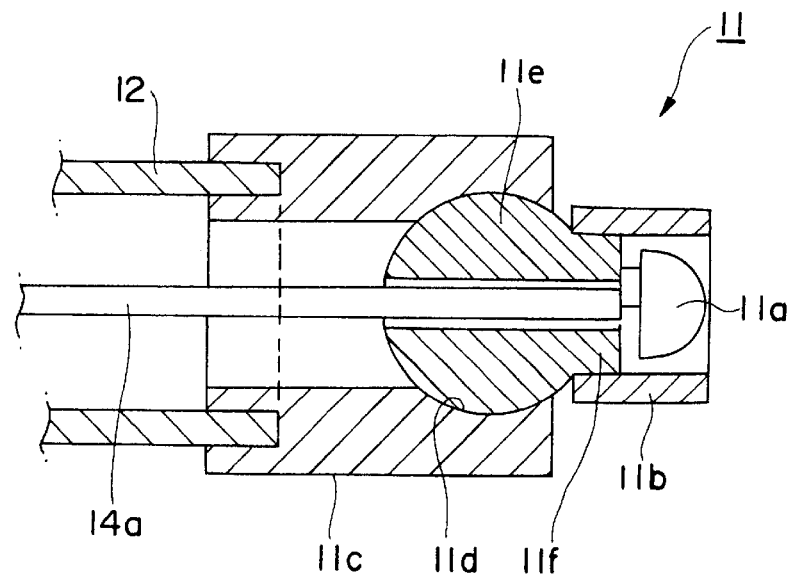
FIG. 9 is a cross-sectional view of a transformation example with respect to the light irradiation portion of the lighting device according to the present invention.

Next, descriptions of deviations of the lighting devices 10, 20, and 32 with respect to the light irradiation portion 11 are to follow, as referring to FIG. 9. The light irradiation portion 11 may be fixed as shown in FIG. 3, but providing the light irradiation portion with a rotatable mechanism portion attached thereto will be more convenient so that it can be arbitrarily rotated up and down, and right and left.

The above-mentioned light irradiation portion 11 is comprised of, as shown in FIG. 9, LED's 11a, fixing members 11b that support these LED's 11a, and linking members 11c that connect the fixing members 11b and the flexible shaft 12, wherein the tip of these linking members 11c is hollowed out in a bulbous shape, and is constructed to form a bulbous bearing 11d, and this bulbous bearing 11d houses a bulbous shaft 11e allowing it to turn and move freely. Then, since the LED's 11a are fixed to the projected end 11f of the bulbous shaft 11e via the fixing members 11b, these LED's can be maintained to rotate up and down, and right and left freely. Incidentally, the bulbous bearing 11d has, as shown in the drawing, a piercing hole, whereas one end of the connecting cable 14a is connected to the LED's 11a via the piercing hole, and the other end thereof employs the bulbous shaft 11e, the bulbous bearing 11d, the linking members 11c and the flexible shaft 12.

By this construction, although the structure of the light irradiation portion 11 becomes relatively complicated, the light irradiation portion 11 can be rotate in any way independent of turnability of the flexible shaft 12, thus desired locations can be illuminated more appropriately and accurately.

Figure 10:
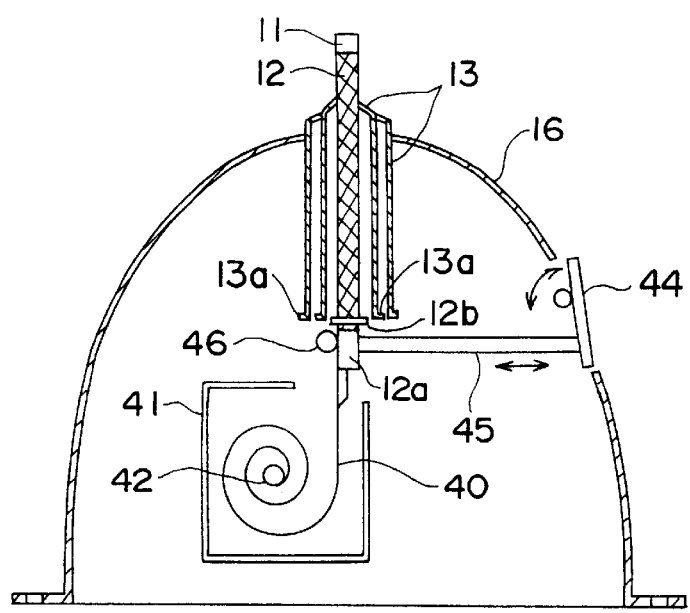
FIG. 10 shows a spring mechanism of the lighting device according to the present invention, and is a cross-sectional view of the extendible portions and the flexible shaft in their shortened state.
Figure 11:
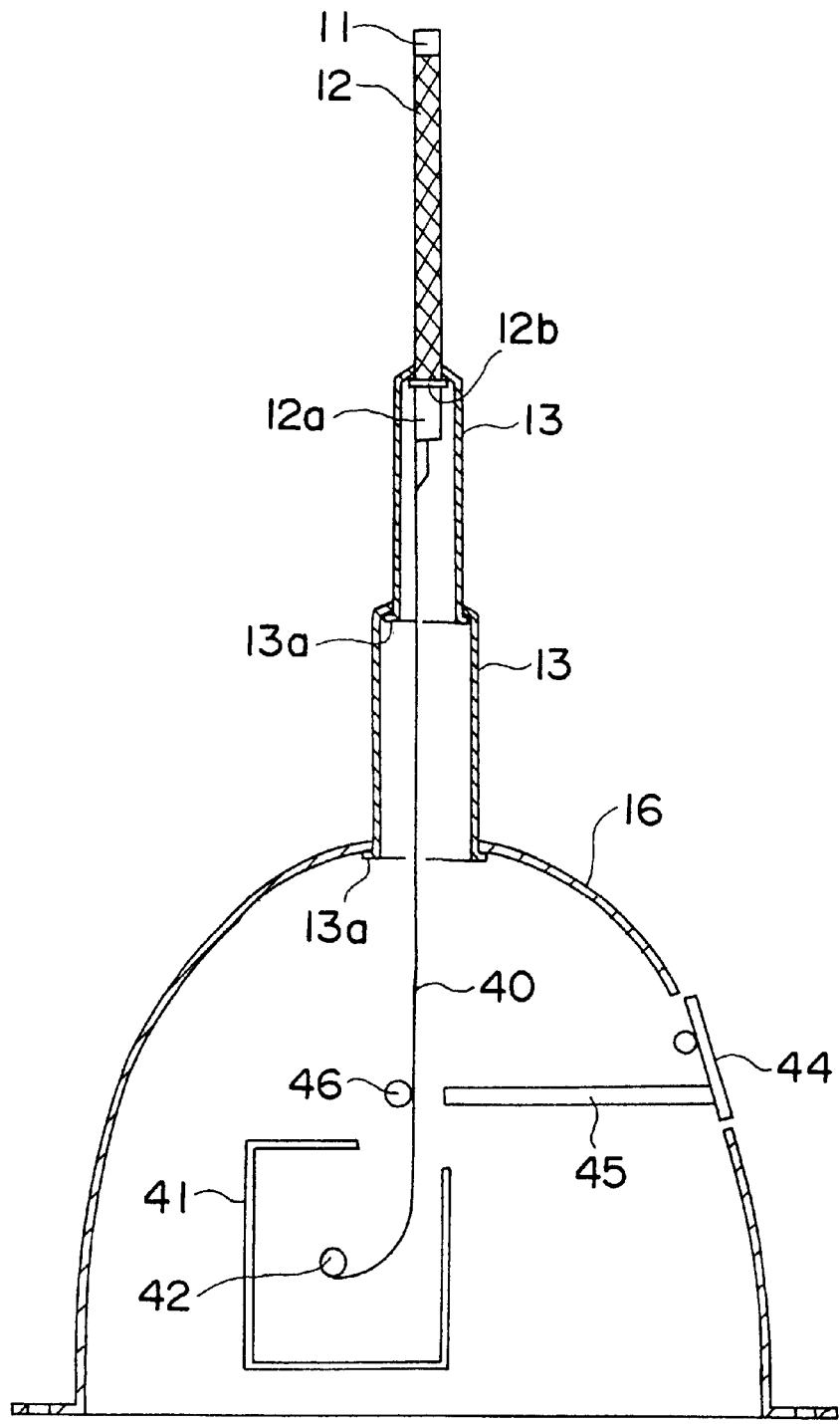
FIG. 11 is a cross-sectional view of the extendible portions and the flexible shaft being extended by the spring mechanism shown in FIG. 10.

Moreover, FIGS. 10 and 11 show a spring mechanism that is provided to extend the extendible portions and the flexible shaft housed inside the case.

As mentioned in the above, the extendible portions 13 and the flexible shaft 12 may be extended manually; however, by arranging a built-in spring mechanism in the case 16 for the extension purpose, operation becomes easier.

As these figures show, a coil spring 40 is housed in a frame 41 that is formed inside the case 16, one end of the coil spring 40 is supported by a support shaft 42 that is fixed into the frame 41, and the other end thereof is connected to the base 12a of the flexible shaft 12. Then, as FIG. 10 shows, when the apparatus is not in use, the coil spring 40 can be compressed, and the extendible portions 13 and the flexible shaft 12 can be housed inside the case 16, wherein a lock mechanism maintains the shortened state.

This lock mechanism is, in the shown example, operated via the lock/release changeover switch 44 located on the surface of the case 16. That is, in the locked state, as shown in FIG. 10, the changeover switch 44 is pressed to one side, whereby the lock rod 45 sticks out, and the base 12a of the flexible shaft 12 is to be bound between the lock rod 45 and the lock support portion 46, which maintains the locked state.

In contrast, when the apparatus is in use, by pressing the changeover switch 44 to the other side, the lock rod 45 is withdrawn, and the base 12a of the flexible shaft, which has been bound between the lock rod 45 and the lock support portion 46, is released. Then, as shown in FIG. 11, the spring effect of the coil spring 40 allows the flexible shaft 12 to extend, and the flange 12b arranged at the base 12a thereof collides with the top part of the inside of the extendible portions 13. In accordance with this collision, the multi-nested extendible portions 13 extend one after another, and upon the flange 13a of the outermost extendible portions 13 being collided with the inside of the case 16, the apparatus is fixed and maintained at a fully extended state. In this state, by turning the flexible shaft 12 appropriately, desired locations can be illuminated.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A lighting device comprising:
    a light irradiation portion comprised of light-emitting elements;
    a flexible shaft having a tip, and that is freely turnable and supports said light irradiation portion at the tip;
    extendible portions that support said flexible shaft, and provide a nested housing for each one of the extendible portions;
    a drive portion that drives the light irradiation portion;
    a power supply portion that supplies electric power to the drive portion; and
    a case covering the above-mentioned drive portion at least.

2. A lighting device as set forth in claim 1, further comprising a rotatable mechanism portion, which rotates said light irradiation portion, between the said light irradiation portion and said flexible shaft.

3. A lighting device as set forth in claim 1, further characterized in that said extendible portions can be extended from said case so that they can be housed in the case in a shortened state.

4. A lighting device as set forth in claim 1, characterized in that said extendible portions are constructed to maintain at a desired angle to said case.

5. A lighting device as set forth in claim 1, further characterized in that said case has fixing portions so that it can be fixed to a wall surface or a ceiling surface.

6. A lighting device as set forth in claim 1, further characterized in that said case houses said extendible portions, the drive portions, and the power supply portion comprised of cells to ensure portability.

7. A lighting device as set forth in claim 1, said case further comprising an operational panel, said light irradiation portion being capable of being positioned to light up desired locations on the operational panel.

8. A lighting device characterized in that it has a light irradiation portion comprised of light-emitting elements;
    a flexible shaft having a tip, and that is freely turnable and supports said light irradiation portion at the tip;
    extendible portions that support said flexible shaft, and provide a nested housing for each on of the extendible portions;
    a drive portion that drives the light irradiation portion;
    a power supply portion that supplies electric power to the drive portion;
    a case covering said drive portion at least; and
    a spring mechanism that allows said extendible portions and said flexible shaft to extend; and
    further characterized in that said spring mechanism allows said extendible portions to extend as said flexible shaft extends.

9. A lighting device as set forth in claim 8, further characterized in that said spring mechanism has a lock mechanism, whereby said extendible portions and the flexible shaft, when not in use, can be housed in said case so as to maintain their shortened state.

10. The lighting device of claim 1, said light irradiation portion further comprising:
    a linking member connected to the tip of the flexible shaft, said linking member having a bulbous bearing;
    a bulbous shaft mounted in said bulbous bearing, said bulbous shaft having a piercing hole; and a fixing member mounted on a portion of the bulbous shaft opposite the flexible shaft;

said light emitting elements being supported in the fixing member.

11. A lighting device, comprising:

a light emitting diode;

a flexible shaft having a tip and a base portion, said flexible shaft connected to the light emitting diode at the tip for supporting the light emitting diode;

extendible portions connected to said base portion of said flexible shaft, said extendible portions being nested and linked to each other so as to be slidable in and out of each other and to support said flexible shaft when the flexible shaft is pulled out from the extendible portions, and said flexible shaft being freely turnable with respect to the extendible portions;

a drive portion for driving said light emitting diode;

a power supply portion for supplying electric power to the drive portion; and a case covering at least said drive portion.

* * * * *